(No Model.)
P. J. SPRAGUE.
Flour and Meal Sifter.
No. 232,562. Patented Sept. 21, 1880.
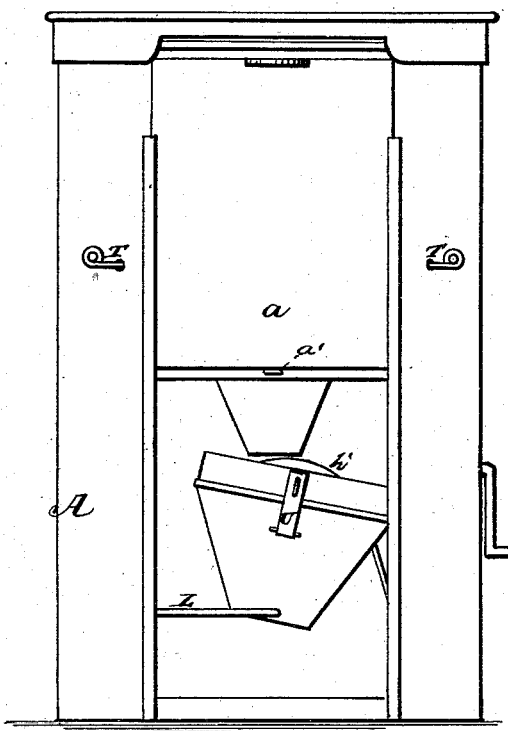
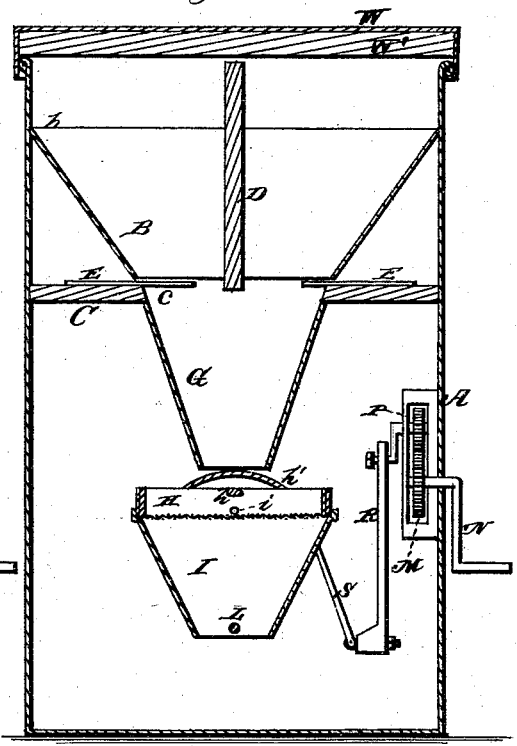
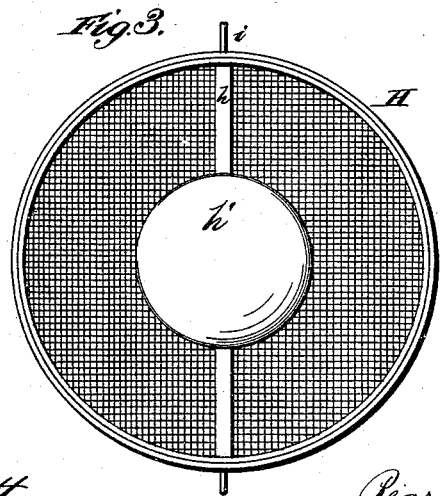
WITNESSES
Robert Everett
Chas. G. Page
INVENTOR
Pearley J. Sprague
Gilmore, Smith & Co.
ATTORNEYS (No Model.)
P. J. SPRAGUE.
Flour and Meal Sifter.
No. 232,562. Patented Sept. 21, 1880.
2 Sheets—Sheet 2.
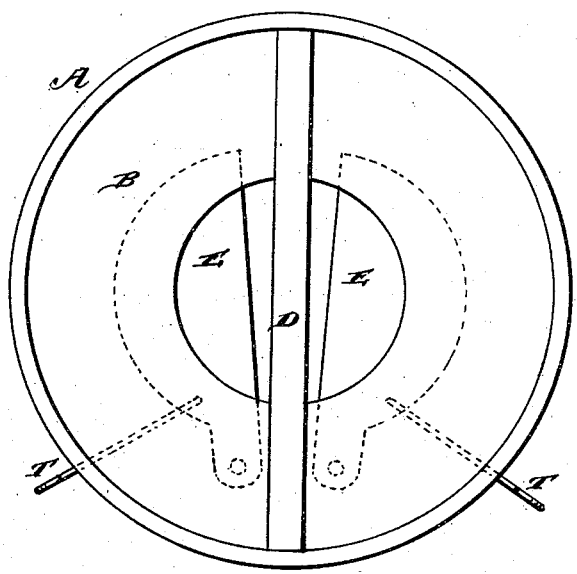
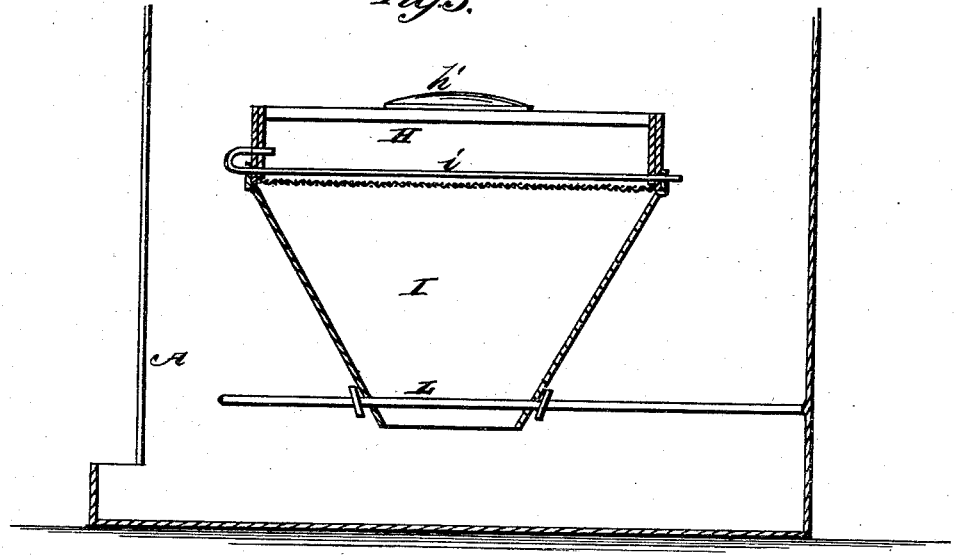
WITNESSES
Robert Everett
Chas. G. Page
INVENTOR
Pearley J. Sprague
Gilmore Smith & Co.
ATTORNEYS

UNITED STATES PATENT OFFICE.

PEARLEY J. SPRAGUE, OF TERRE HAUTE, INDIANA, ASSIGNOR TO HIMSELF AND JOHN S. KING, OF SAME PLACE.

FLOUR AND MEAL SIFTER.

SPECIFICATION forming part of Letters Patent No. 232,562, dated September 21, 1880.

Application filed April 10, 1880. (No model.)

*To all whom it may concern:*

Be it known that I, PEARLEY J. SPRAGUE, of Terre Haute, in the county of Vigo and State of Indiana, have invented certain new and useful Improvements in Flour and Meal Sifters; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a front of my flour and meal sifter, partly open to show the interior. Fig. 2 is a longitudinal sectional view of the same. Fig. 3 is a view of the sieve. Fig. 4 is an interior plan view, and Fig. 5 is a sectional view.

The present invention relates to a flour and meal sifter; and it consists in the features of construction and combination hereinafter described, and particularly pointed out in the claims.

In the drawings, A designates a cylindrical casing which is open at its top end and closed at the bottom. This casing has a sliding door, $a$, which, when raised, is retained in an elevated position by a spring, $a'$.

In the upper portion of the casing A is arranged a conical hopper, B, the rim $b$ of which is secured to the casing. Below the hopper is arranged a partition, C, having a central passage, $c$, equal in area to the area of the discharge-opening of the hopper. The hopper is divided by a partition, D, so that its discharge-opening will be likewise divided. The two outlets thus formed are opened or closed by valves E E, which slide upon the partition C, so that when a considerable quantity of flour or meal remains in the hopper after closing the valves the partition C will support the valves against the weight upon them.

By dividing the hopper by a vertical partition into two compartments flour can be placed in one compartment and meal in the other, thus admitting of the feed of either one or both articles together to the vibratory sieve.

The partition C supplies a support for a conical funnel, G, the upper rim of which is secured in any suitable way to the partition.

The sieve H is detachably secured to a vibratory funnel, I, in any ordinary mechanical way—as, for instance, by means of a rod, $i$, which fits into a hole in the upper portion of the conical funnel I. A bar, $h$, extends across the sieve, and is secured to its upper rim, said bar being provided with a deflecting-plate, $h'$, upon which the flour or meal falls as it passes out from the funnel G. The vibrations of the funnel I cause a like movement of this deflecting-plate under the funnel G, so that when the deflecting-plate is directly under the discharge-opening of the funnel G the feed of the flour or meal will be retarded, thus preventing too much of either article from being fed into the sieve and keeping the feed proportionate to the amount sifted out. When the deflecting-plate is inclined to either side, however, the flour or meal feeds freely upon it, and is deflected to either side of the sieve, according to the side to which the deflecting-plate is vibrated.

I find that by thus introducing the flour or meal into the sieve near its sides better results are obtained than if it were introduced to the center thereof, since in vibrating the sieve the tendency of the flour or meal will be to collect in the center of the same.

The sifted flour or meal passes through the funnel below the sieve and falls upon any receptacle placed on the bottom of the casing. This funnel vibrates upon a bar, L, which is secured to the casing A.

The mechanism for vibrating the funnel which carries the sieve consists of a gear, M, actuated by a handle, N, and gearing with a gear, P, upon the shaft of said gear P, a crank-handle being formed which operates a pitman, R, and this, in turn, actuates the funnel through the medium of a connecting-rod, S.

The valves of the upper hopper are operated by rods T, and a hinged clasp is provided for securing the sieve to the vibratory funnel, this clasp being employed in addition to the rod before mentioned.

The cover W of the casing is provided with a board, W', which serves as a bread-board.

What I claim is—

1. In a flour or meal sifter, the combination of a vibratory sieve with the hopper B, slide-valves E, and the conical funnel G, substantially as specified.

2. In a flour or meal sifter, the combination of a vibratory funnel, I, carrying a sieve, with the hopper B and funnel G, substantially as specified.

3. The combination of the hopper B, having a central vertical partition, with the partition C, having a central opening, the slide-valves E, the funnel G, the sieve H, secured upon a vibratory funnel, I, and the pitman R, connecting with the vibratory funnel by a connecting-rod and with the crank-arm of one of the actuating gear-wheels, substantially as specified.

In testimony that I claim the above I have hereunto subscribed my name in the presence of two witnesses.

PEARLEY J. SPRAGUE.

Witnesses:
JAMES W. HURST,
W. H. LIGHT.